(12) United States Patent
Takagi

(10) Patent No.: US 7,255,491 B2
(45) Date of Patent: Aug. 14, 2007

(54) OPTICAL MODULE

(75) Inventor: Toshio Takagi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 189 days.

(21) Appl. No.: 10/902,260

(22) Filed: Jul. 30, 2004

(65) Prior Publication Data

US 2005/0047475 A1    Mar. 3, 2005

(30) Foreign Application Priority Data

Aug. 1, 2003    (JP) .............................. 2003-285348

(51) Int. Cl.
*G02B 6/42* (2006.01)

(52) U.S. Cl. ......................... 385/88; 385/92

(58) Field of Classification Search ............. 385/76–94
See application file for complete search history.

(56) References Cited

U.S. PATENT DOCUMENTS

| | | | | |
|---|---|---|---|---|
| 5,337,392 A | * | 8/1994 | Mousseaux et al. | 385/90 |
| 5,960,141 A | * | 9/1999 | Sasaki et al. | 385/88 |
| 6,130,444 A | * | 10/2000 | Hashizume et al. | 257/81 |
| 6,181,854 B1 | * | 1/2001 | Kojima et al. | 385/49 |
| 6,207,950 B1 | | 3/2001 | Verdiell | |

FOREIGN PATENT DOCUMENTS

| | | |
|---|---|---|
| JP | 09-171126 | 6/1997 |
| JP | 10-311936 | 11/1998 |

\* cited by examiner

*Primary Examiner*—Michelle Connelly-Cushwa
(74) *Attorney, Agent, or Firm*—McDermott Will & Emery LLP

(57) ABSTRACT

One object of the present invention is to provide a new arrangement for an optical module that enables to align the optical fiber with the semiconductor optical device in active alignment technique. The optical module of the present invention includes a container, a base and a ferrule assembly. The ferrule assembly integrates the optical fiber, the ferrule and the holder, in which the ferrule secures the optical fiber in a center thereof and the holder having a V-groove secures the ferrule in the V-groove. The container has a depression, one end of which is opened, for receiving the ferrule therein. The semiconductor optical device is mounted on a region opposite to the open of the depression of the container. Both sides of the depression are regions on a primary surface of the container, and, when the holder is placed on these two regions, the ferrule is set within the depression with gaps against side surfaces of the depression. Thus, by sliding the holder on the container, the optical fiber can be actively aligned with the semiconductor optical device mounted on the container in directions parallel to the optical axis and within the primary surface of the container.

6 Claims, 5 Drawing Sheets

OPTICAL MODULE

BACKGROUND OF THE INVENTION

1. Field of the Invention

The present invention relates to an optical module.

2. Related Prior Art

A semiconductor laser module disclosed in the Japanese patent published as H09-171126 includes a V-groove formed on a substrate for defining positions of an optical fiber, a scale provided within the V-groove for aligning the optical fiber along an optical axis in the V-groove, and a semiconductor laser disposed on the substrate. Using the scale, it is facilitated for the optical fiber to align along the optical axis after installing the fiber within the V-groove.

Another Japanese patent published as H10-311936 discloses an optical module using a guide substrate that includes a guide groove for securing an optical fiber and another groove formed in an end of the guide groove. In this optical module, a semiconductor laser is mounted on a mounting substrate different to the guide substrate. The mounting substrate is placed on the guide substrate such that the primary surface thereof faces the primary surface of the guide substrate. Thus, the semiconductor laser on the mounting substrate locates within the groove of the guide substrate, and an optical alignment of the semiconductor laser may be carried out by adjusting the position of the mounting substrate on the guide substrate as monitoring an optical output from the semiconductor laser. At a position where the output power obtained from the semiconductor laser diode becomes a maximum, the mounting substrate is rigidly fixed to the guide substrate.

In the semiconductor laser module disclosed in the former application, H09-171126, since the optical fiber is secured within the V-groove, the position of the optical fiber can not be adjusted along a direction intersecting the V-groove. On the other hand, the position of the optical fiber can be easily aligned along the V-groove by utilizing the scale provided along the V-groove. In the other optical module disclosed in the latter application, H10-311936, the semiconductor laser may be aligned, in the guide substrate, with the optical fiber secured in the guide groove. However, the semiconductor laser can be adjusted its position only in a quite narrow groove provided in the guide substrate, so only a slight margin is allowed for the optical alignment.

Therefore, one of objects of the present invention is to provide an innovative structure for an optical module that is capable of aligning in active between a semiconductor optical device and an optical fiber secured in a V-groove.

SUMMARY OF THE INVENTION

According to one aspect of the present invention, an optical module is to be provided. The optical module includes an optical semiconductor device, a ferrule assembly, and a container. The ferrule assembly has a ferrule for securing an optical fiber and a holder for holding the ferrule. The holder includes a groove into which the ferrule is secured and two surfaces sandwiching the groove. The container has a depression, formed by a bottom and two side surfaces and one end of which is opened, for securing the ferrule therein. A primary surface of the container opposite to the open end of the depression mounts the semiconductor optical device thereon. Further, both sides of the depression include a pair of regions. When two surfaces of the holder, that sandwich the groove, are faced and fixed to these regions on the primary surface of the container, the ferrule is set within the depression with gaps against the bottom and two side surfaces of the depression. Accordingly, by sliding the holder that secures the ferrule on the primary surface of the container, the optical fiber secured in the ferrule can be aligned with the semiconductor optical device mounted on the primary surface of the container in active.

The groove formed in the holder may have a V-shaped cross section to fix the ferrule in passive within the groove. Further, the ferrule and the holder may be integrally formed with each other. The optical axis of the optical fiber secured in the ferrule may be involved in the primary surface of the container.

The semiconductor optical device may be a semiconductor laser diode or a semiconductor photodiode. In the case of the semiconductor laser diode, the optical module becomes a light-emitting module using an active alignment technique, while in the case of the photodiode, the optical module becomes a light-receiving module.

The present optical module may further provide a base and a photodiode. The photodiode detects light emitted from the optical semiconductor device and generates an electrical signal corresponding to a detected optical signal. The base includes a first region for mounting the container, which holds the ferrule and the holder, a second region for mounting the photodiode, and a step between these first and second regions. A position of the container may be decided on the base such that one side of the container opposite to the open end of the depression butts against the step formed between first and second regions. The side of the container butting against the step has a chamfered corner to precisely define the position of the container by butting.

The second region of the base may provide interconnection to bring the electrical signal out from the photodiode, and to supply to or take out from an electrical signal of the semiconductor optical device.

The second region of the base may further include a step. The photodiode may be mounted on the side of the step such that a light-sensitive surface faces the semiconductor optical device.

DETAILED DESCRIPTION OF PREFERRED EMBODIMENTS

Figure 1:
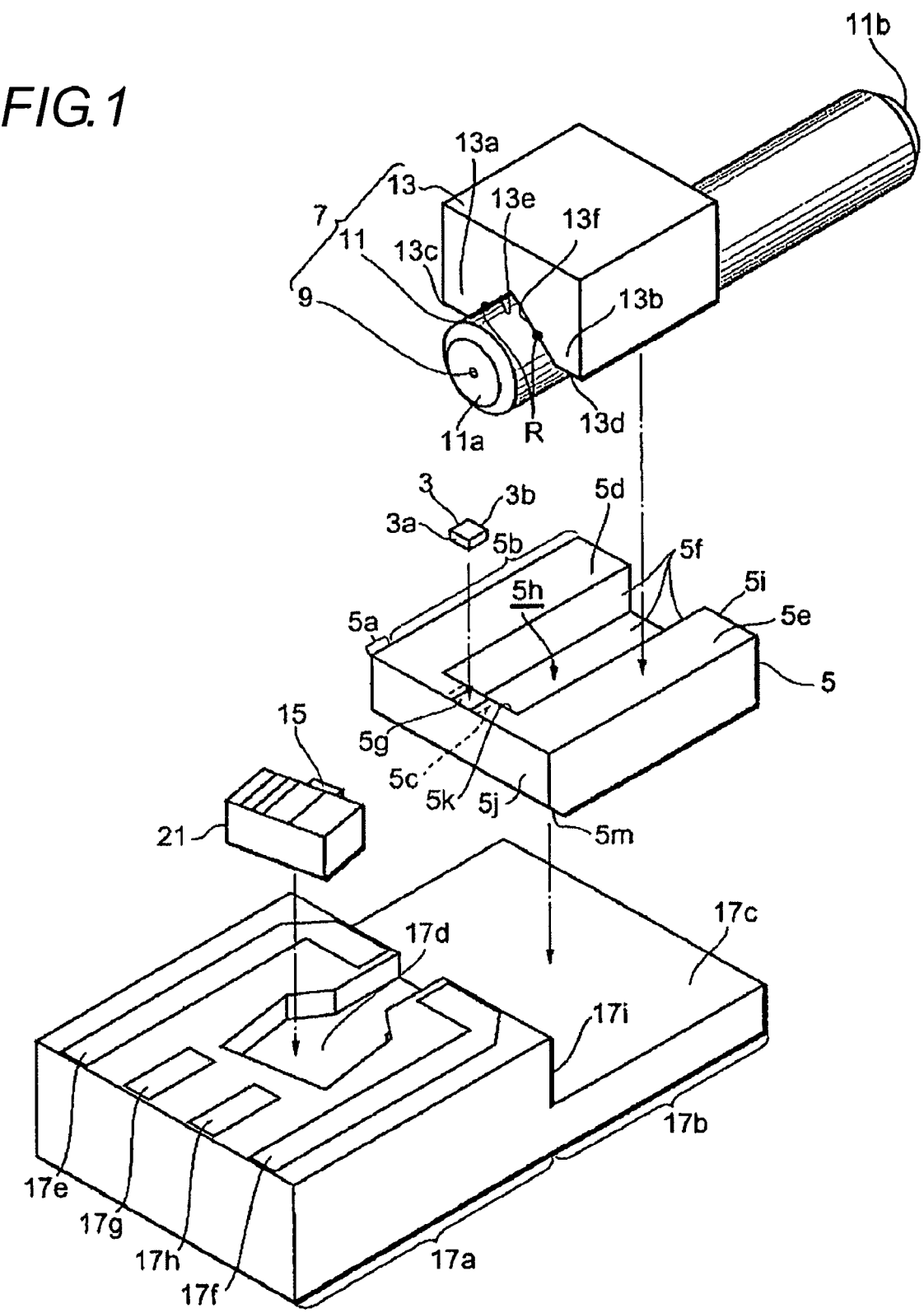
FIG. 1 is an exploded view of an optical module according to the first embodiment of the present invention.

Next, preferred embodiments of the present invention will be described as referring to accompanying drawings. In the drawings and the specification, if possible, the same symbols or the same numerals will refer same elements without overlapping explanations.

First Embodiment

Figure 2:
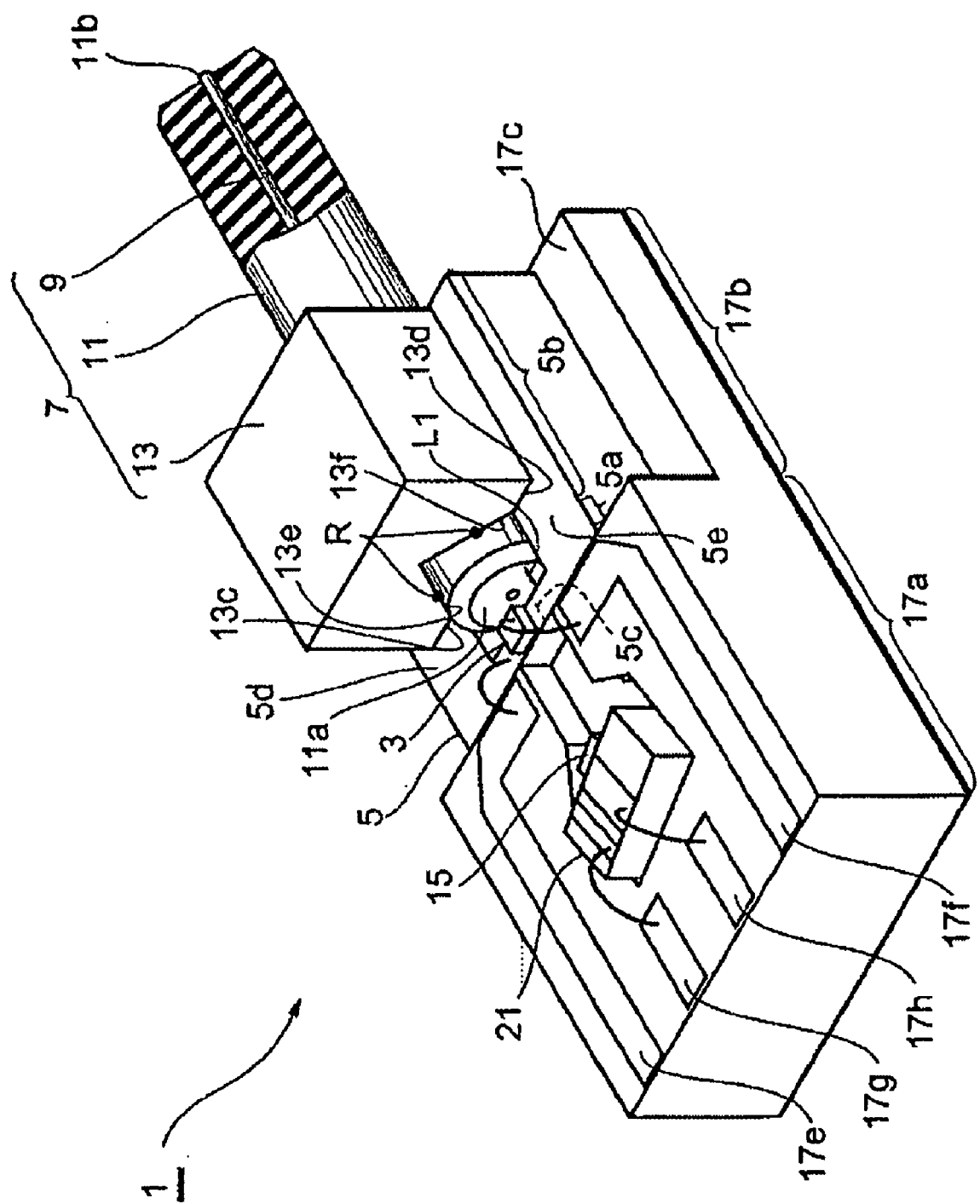
FIG. 2 is a perspective view showing the optical module of the first embodiment.
Figure 3A:
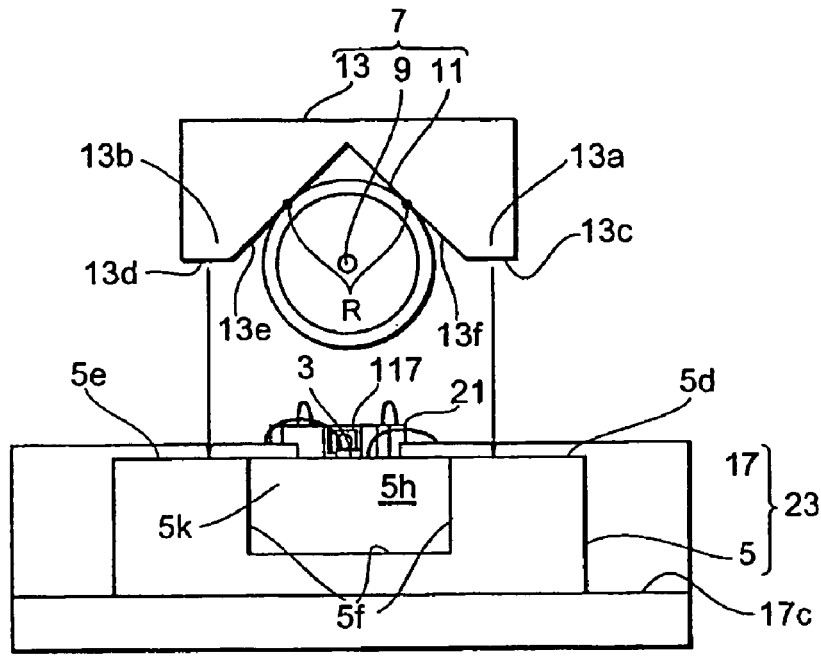
FIG. 3A is a cross section showing a ferrule assembly and a container before they are assembled each other.
Figure 3B:
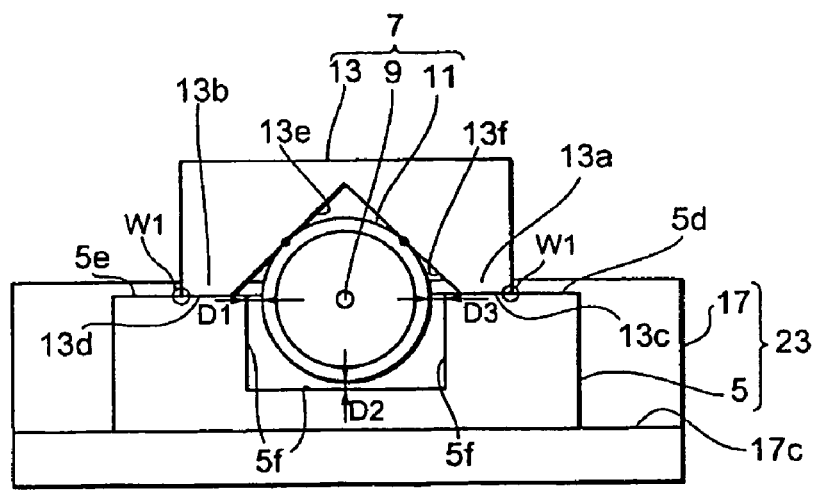
FIG. 3B is a cross section showing the ferrule assembly mounted on the container.

FIG. 1 is an exploded view of an optical module 1 according to the present invention, FIG. 2 is a perspective view and FIG. 3A and FIG. 3B are sectional views showing processes for the optical module 1.

The optical module includes a semiconductor optical device 3, a container 5 and a ferrule assembly 7.

The ferrule assembly 7 includes an optical fiber 9, a ferrule 11 for supporting the optical fiber 9, and a holder 13 for securing the ferrule 11. The holder 13 has a groove 13e in the center thereof and first and second portions 13a and 13b, respectively, in both sides of the groove 13e. Respective bottom surfaces 13c and 13d of the first and second portions 13a and 13b, face first and second regions 5d and 5e of the container 5, whereby both surfaces 13c and 13d are fixed to the corresponding regions 5d and 5e.

More specifically, the holder 13 includes the first and second surfaces 13e and 13f for fixing the ferrule 11, accordingly the ferrule 11 is positioned along to directions intersecting the optical axis of the fiber by these two surfaces 13e and 13f. Two surfaces 13e and 13f have a cross section of a V-shape having a preset angle therebetween. A depth and the angle of the V-groove are adjusted such that, when the ferrule is secured within the groove, the axis of the optical fiber is substantially within a plane including the surfaces 13c and 13d.

The holder 13 may be made of resin, such as polyester, ferrous metal of SC or sintered metal such as copper tungsten (CuW). The ferrule 11 may be also made of resin, such as polyester, ferrous metal of SC, or sintered metal of CuW. The ferrule 11 is in contact with two surfaces 13e and 13f of the V-groove at outer surfaces R thereof with an adhesive or the welding when both the ferrule and the holder are made of metal.

The optical fiber 9, extending from one end 11a of the ferrule 11 to the other end 11b thereof, appears at the end 11a and optically couples with the semiconductor optical device 3. In the present embodiment, as shown in a symbol L1 in FIG. 2, the ferrule assembly 7 and the container 5 are assembled such that the end of the ferrule 11a is apart from the end 5k of the groove 5h provided in the container 5. The optical fiber 9 may be a mode field diameter (MFD) converting fiber to enhance an optical coupling efficiency between the semiconductor optical device 3 and the optical fiber 9. That is, the MFD converting fiber has a configuration that the MFD thereof gradually expands toward the end 11a of the optical fiber. However, the MFD converting fiber is not essential in the present invention.

The container 5 includes first and second portions 5a and 5b. The first portion 5a provides a region 5c where the semiconductor optical device 3 is to be mounted thereon, while the second portion 5b provides first and second regions, 5d and 5e, respectively. The first and second regions 5d and 5e are connected with the bottom surface of the container, whereby the first and second regions 5d and 5e, and the bottom surface thereof form a depression 5h, opening an end 5i thereof and having three inner surfaces 5f. The other end of the depression 5h extends to the region 5c and provides a side surface 5k thereat. The depression 5h receives the ferrule 11 not buried within the groove of the holder 13.

The first and second regions 5d and 5e sandwiches the depression 5h therebetween, and by sliding respective surfaces 13c and 13d of the holder 13 on these two regions 5d and 5e, the optical fiber 9 secured in the holder 13 and the semiconductor optical device 3 mounted in the region 5c of the container can be optically aligned to each other.

Further, when the two surfaces 13c and 13d of the holder 13 are in contact with corresponding regions 5d and 5e of the container 5, the side surface of the ferrule 11 makes a gap to any side surfaces 5f of the depression 5h. That is, as shown in FIG. 3B, the ferrule 11 is set in the depression 5h such that the side surface thereof makes gaps D1, D2 and D3 to respective side surfaces 5f of the depression 5h. Thus, the ferrule assembly 7 can be smoothly moved on the container 5.

The semiconductor optical device 3 is mounted on a region 5g of the container 5. The region 5g, together with the first and second regions 5d and 5e, is within the primary surface of the container 5. The surfaces 13c and 13d of the holder 13 and the axis of the optical fiber 9 are substantially in the same plane, and these two surfaces 13c and 13d are fixed to the regions 5d and 5e of the container. Accordingly, the axis of the optical fiber 9 exists within the primary surface of the container 5, which automatically aligns the optical fiber 9 along one direction intersecting to the primary surface of the container 5 among two directions normal to the axis of the optical fiber 9. This arrangement is quite favorable when the optical axis of the semiconductor optical device locates on the primary surface or within a surface quite closed to the primary surface of the container 5. For example, when the semiconductor optical device is an edge-emitting semiconductor laser diode and such laser diode is mounted on the region 5g in an epi-down configuration, the optical axis of the laser diode is in quite close to the region 5g. For such situation, the arrangement for the semiconductor device, the container and the holder of the present will be quite effectual.

The semiconductor optical device 3 may be a semiconductor laser diode, a semiconductor optical amplifier, and another type of semiconductor device that builds in a semiconductor modulator. Further, a semiconductor light-receiving device such as photodiode may be used as the semiconductor optical device 3.

The optical module 1 may further provide base 17 for mounting the container 5. The base includes a first region 17a and a second region 17b for mounting the container 5, namely, the container 5 is mounted on a surface 17c in the second region 17b. The second region 17b is formed in low compared to the first region 17a for mounting the container 5 thereon, accordingly, a step 17i is provided between the first region 17a and the second region. When the semiconductor optical device 3 is a light-emitting device, a light-receiving device 15 may be further installed on the first region 17a. A plurality of interconnections from 17e to 17h and a region 17d for mounting the light-receiving device 15 are formed on the first region 17a. In this arrangement, the light-receiving device 15 receives light emitted from the light-emitting device 3, and generates a photo current corresponding to a received magnitude of the light. By adjusting the position of the container 5 on the base 17, the light-receiving device 15 can be optically aligned with the light-emitting device 3. The light-receiving device 15 is mounted on a side surface of a sub-mount 21, and the sub-mount 21 is mounted in the region 17d of the base 17 such that the light-sensitive surface of the light-receiving device 15 faces the light-emitting device 3. The region 17d is lowered to the periphery such that the light-sensitive surface of the light-receiving device 15, which mounted on the side of the sub-mount 21, may optically couple with the light-emitting device 3.

The interconnections 17e and 17f are provided for supplying a signal to the semiconductor optical device 3, or for extracting a signal generated in the semiconductor optical device 3. The other interconnections 17g and 17h are provided for extracting a signal generated in the light-receiving device 15.

The container 5 is installed on the base 17 such that an end 5j thereof is in contact with the step 17i of the base 17, which automatically aligns along the axis of the optical fiber 9. A lower end of the end 5j of the container 5 has a chamfer 5m, which enables the end 5j thereof to be in contact with the step 17i with no clearance therebetween. The thermal conductivity of the container 5 is preferably greater than that of the ferrule assembly 7. In the optical module 1, the container does not require a complex shape to align the optical fiber 9 with the semiconductor optical device 3. Therefore, a material having a greater thermal conductivity than that of the ferrule assembly 7 may be selected without taking the capability of processing and the process tolerance into account.

As shown in FIG. 3A, a unit 23 that assembles the base 17 with the container 5 and the ferrule assembly 7 are prepared. For the ferrule assembly 7, the ferrule 11 into which the optical fiber 9 is inserted and the holder 13 are assembled in advance. The unit 23 builds the container 5 with the base 17. These assembling of the unit 23 and the ferrule assembly 7 may be carried out independently.

Next, the ferrule assembly 7 is installed on the container 5. As shown in FIG. 3B, the ferrule assembly 7 is placed on the container 5, i.e., two surfaces 13c and 13d of the ferrule assembly 7 are disposed on respective regions 5d and 5e of the container 5. The ferrule 11, as denoted as symbols form D1 to D3, is set within the depression 5h of the container with gaps to the side surfaces 5f thereof. Accordingly, the ferrule assembly 7 may be smoothly slid along the X and Z directions against the container 5.

Figure 3B:
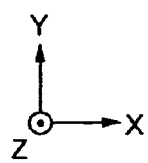

Next, the semiconductor optical device 3 mounted on the container 5 and the optical fiber 9 secured in the ferrule 11 are aligned with each other. After the alignment of the ferrule assembly 7 with the container 5, both members of the ferrule assembly 7 and the container 5 are permanently fixed with adhesive or welding at the position W1 shown in FIG. 3.

Second Embodiment

Figure 4:
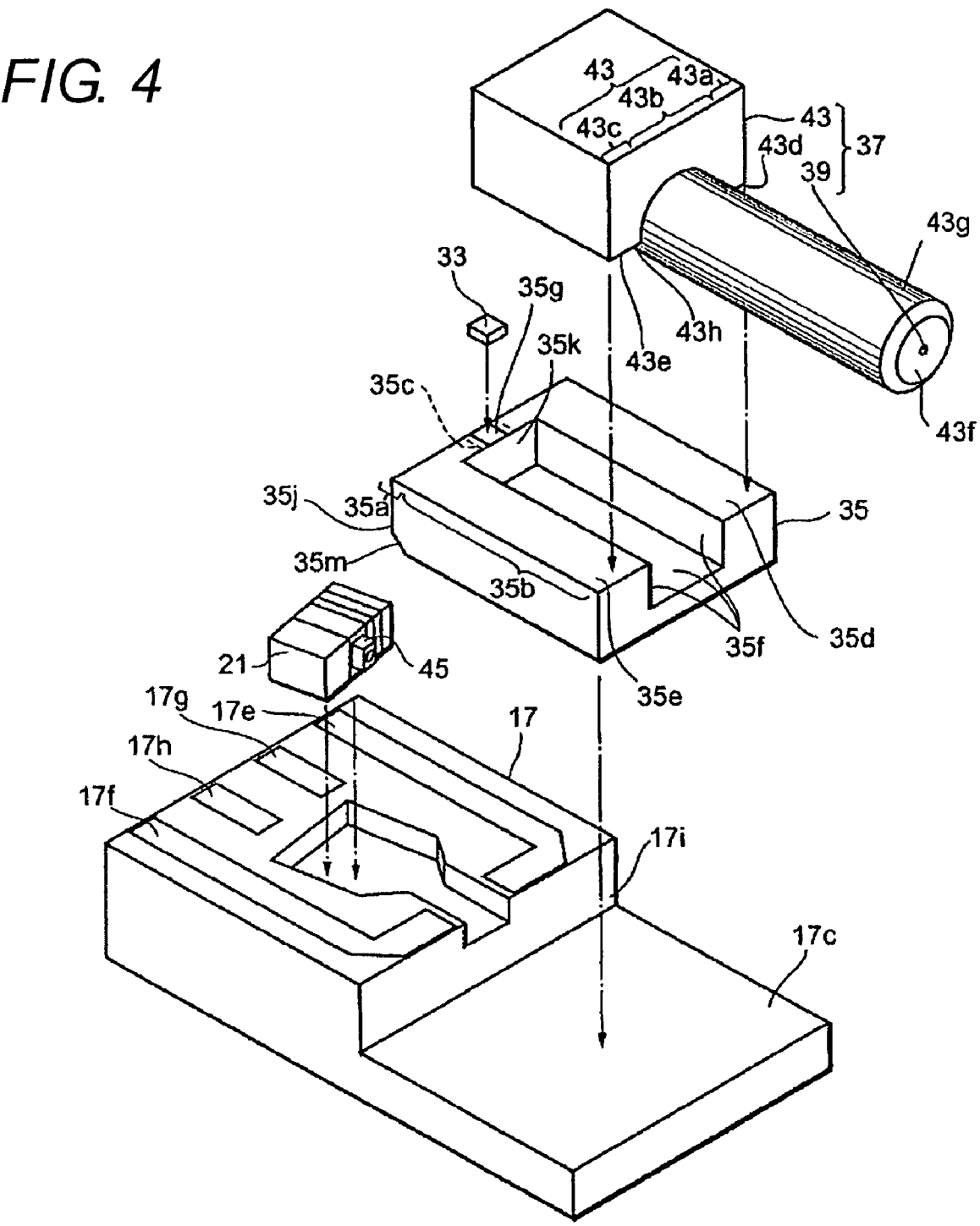
FIG. 4 is an exploded view of an optical module according to the second embodiment of the invention.

FIG. 4 is an exploded view of an optical module 31 according to the second embodiment of the invention. The optical module 31 includes a holder 43 built in a ferrule 43g securing the optical fiber 39. A container 35 of the present embodiment has a bottom connecting the first region 35d to the second region 35e, and a depression, one end of which is opened, for receiving the ferrule 43g formed by these two regions, 35d and 35e, and the bottom. The ferrule 43g is set in the depression with gaps to respective side surfaces 35f. In the present optical module 31, by sliding the ferrule assembly 37 on the container 35, the optical fiber secured in the ferrule assembly 37 can optically couple in active with the semiconductor optical device 33 provided on the container 35.

The optical axis of the optical fiber 39, which is secured in the ferrule 43g, and two surfaces 43d and 43e of the holder 43 are substantially within the same plane. Accordingly, when the holder 43 is installed on the container such that two surfaces, 43d and 43e, face corresponding regions, 35d and 35e, on the container, the axis of the optical fiber 39 can be automatically involved in the primary surface of the container 35, which aligns the optical fiber with the semiconductor optical device 33 mounted on the region 35g of the container 35. The holder of the present embodiment may be made of resin such as polyester.

Third Embodiment

Figure 5:
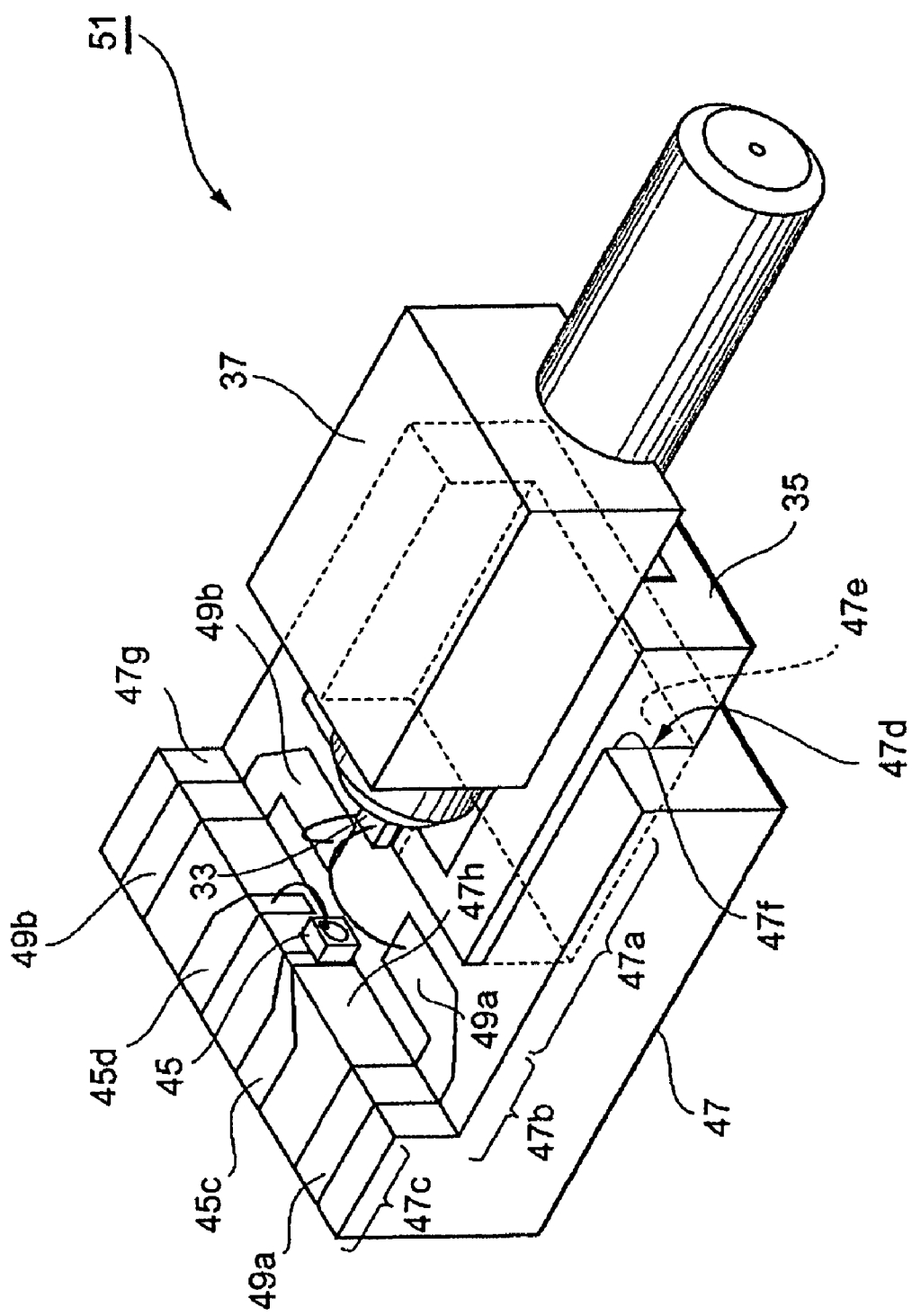
FIG. 5 is a perspective view of an optical module according to the third embodiment of the invention.

FIG. 5 is another perspective view showing a modified optical module 51 according to the third embodiment. The optical module 51 includes another base 47 replacing the base 17 of the optical module 31 of the previous embodiment. The base 47 includes first to third regions 47a to 47c disposed in this order. The first region 47a has a region 47d that receives the container 35 therein. The region 47d comprises a surface 47e for mounting the container 35 and two sides 47f, and are formed as a depression. Between the second region 47b and third regions 47c is formed a step 47g, and the side surface of the step 47g mounts the light-receiving device 45 thereof. The second region 47b also provides interconnections 49a and 49b for the semiconductor optical device 33 mounted on the container 35. The third region 47c provides, in addition to expanding portions from the interconnections 48a and 49b, another interconnections 45c and 45d for the light-receiving device 45.

Also in the optical module 51, the ferrule 43g formed integrally with the holder 43 is set within the depression of the container 35 with gaps against inner surfaces of the depression. Further, the axis of the optical fiber 39 exists within the same plane in substance with the primary surface of the container 35, the active alignment between the semiconductor optical device 33 mounted on the container 35 and the optical fiber 39 can be carried out along in two directions, i.e., parallel to the optical axis of the fiber 39, and one of directions intersecting the optical axis and parallel to the primary surface of the container 35.

Since the optical module disclosed herein may be provided in a variety of different configurations, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. An optical module, comprising:
   a semiconductor laser diode;
   a ferrule assembly including a ferrule for securing an optical fiber and a holder for securing said ferrule, said holder has a groove for securing said ferrule and a pair of surfaces each sandwiching said groove;
   a container having a primary surface and a depression with an opening, a bottom and two side surfaces, said primary surface including a mounting region and a pair of regions surrounding said depression, said mounting region mounting said laser diode and being in opposite to said opening, said pair regions facing said pair surfaces of said holder; and
   a base including first and second regions and a step formed between said first and second regions to lower said first region against said second region, said first region installing said container and said second region mounting a photodiode for detecting light emitted from said laser diode such that a side of said container butts against said step, wherein said ferrule, when said pair of surfaces of said holder is foxed to said pair of regions of said container, is set within said depression with gaps against said bottom and two side surfaces of said container to optically align said optical fiber with said laser diode.

2. The optical module according to claim 1,
wherein a corner between said side butting against said step and a surface facing said base opposite to said primary surface of said container is chamfered.

3. The option module according to claim 1,
wherein said second region of said base provides interconnections to connected to said laser diode and said photodiode.

4. The optical module according to claim 1,
wherein said second region of said base further includes a lowered region, said photodiode being mounted in said lowered region via a sub-mount such that a light-sensitive surface of said photodiode directly faces said laser diode.

5. The optical module according to claim 1,
wherein said groove provided in said holder has a V-shaped cross section having two inner surfaces each coming in contact with a side surface of said ferrule.

6. The optical module according to claim 1,
wherein an optical axis of said optical fiber and said pair surfaces of said holder are involved within a substantially same plane such that, when said ferrule assembly is fixed to said container, said optical axis is optically aligned with said laser diode mounted on said primary surface of said container.

* * * * *